April 11, 1967     HANS-JOACHIM M. FÖRSTER     3,313,385

FRICTION CLUTCH

Filed June 28, 1965

INVENTOR
HANS-JOACHIM M. FÖRSTER

BY *Dicke + Craig*

ATTORNEYS 3,313,385
FRICTION CLUTCH
Hans-Joachim M. Förster, Stuttgart-Riedenberg, Germany, assignor to Daimler-Benz Aktiengesellschaft, Stuttgart-Untertürkheim, Germany
Filed June 28, 1965, Ser. No. 467,277
Claims priority, application Germany, June 30, 1964, D 44,799
9 Claims. (Cl. 192—69)

The present invention relates to a resilient or springy support of clutch lamellae in which the counterpressure plate is supported against a securing ring constructed as elastic abutment which, in turn, is inserted into a groove of a lamellae bearer or support member.

With such known, prior art support, the counterpressure plate displaceable in an axial limited manner on the inner lamellae support abuts with the side thereof opposite the lamellae or friction disks directly against a securing ring tiltably arranged in an enlarged groove of the inner lamellae bearer or support member. For purposes of achieving the spring effect, a bending moment has to be produced at the securing ring by way of the counterpressure plate. For that purpose, chamfered or beveled configurations, rounded-off portions, or apertures are required at the side of the counterpressure plate facing the securing ring in order to obtain an effective lever arm between the lines of action or points of application of the force engagements at the counterpressure plate and the groove of the lamellae bearer member. With the customary prior art standardized securing rings the resulting radial bending length is inadequate in the tilted position thereof in order to be able to constitute the lever arm necessary for achieving a predetermined elasticity of the spring. Consequently, with the known support arrangements, special securing rings are used which, together with the counterpressure plates to be constructed in the special manner described above, considerably complicate the construction and increase the cost thereof. As a result of the tilted position of the securing ring with the known resilient support, nonpermissively high edge-pressures are produced by the clutch actuation at the groove of the lamellae bearer members and the securing ring, on the one hand, and at the counterpressure plate and the securing ring, on the other. The result is a rapid wear at the mutual engaging surfaces of these parts so that the maintenance of a predetermined spring characteristic as well as a closely dimensioned venting play cannot be assured.

A further disadvantage of this known resilient support resides in the fact that by reason of the securing ring brought into the tilted position, the lever arm between the abutment force and the actuating force for the clutch lamellae or friction disks changes so that the latter engages with a resilient or springy counterpressure plate at the friction surfaces of the lamellae along radially differing lines of action or points of application.

The present invention aims at the elimination of the aforementioned disadvantages and at the improvement of a resilient support of clutch lamellae of the type described above and is characterized essentially in that the securing ring is so constructed and so arranged at the lamellae bearer or support member that the lines of action of the abutment force effective on the securing ring and of the actuating force for the clutch lamellae have a constant distance whereby the securing ring is constructed in the manner of an undulated spring ring and the counterpressure plate is constructed on the side opposite the lamellae for the parallel guidance of the securing ring.

The advantage is achieved by the present invention that the securing ring during clutch actuation exclusively carries out, as a result of the parallel displacement, purely axial spring movements so that the spring characteristics of the support always remain the same even after longer operating periods because disadvantageous wear appearances do not occur with the support of the clutch lamellae in accordance with the present invention. As a further development of the present invention, the groove for the accommodation of the securing ring is so constructed that the securing ring, with non-actuated clutch lamellae or disengaged friction disks, is under a prestress effective in a direction opposite the clutch actuation. The spring characteristics of the support may thereby be influenced in a far-reaching manner such that with initiated clutch actuation larger starting torques can be transmitted. With one construction in accordance with the present invention the same utilizes an aperture or recess provided in the counterpressure plate for the parallel guidance of the securing ring which prevents that the securing ring during spring deflections is brought into a unfavorable tilted position. It is known with counterpressure plates to provide a radial aperture for shortening the over-all axial constructional length of the lamellae or friction disk clutch. In the present invention, however, an axial exposed outer surface somewhat similar to the known radial aperture prevents the tilting of the securing ring during its spring movement.

Accordingly, it is an object of the present invention to provide a friction disk clutch including a resilient support of the friction disks or lamellae thereof which obviates, by extremely simple means and in an operationally reliable manner, the aforementioned disadvantages encountered with the prior art constructions.

Another object of the present invention resides in the provision of a resilient support for the friction disks of clutches whose construction is relatively simple, which involves relatively low cost and which is substantially free of troublesome wear appearances notwithstanding operation thereof during long periods of time.

Another object of the present invention resides in the provision of a resilient support for the clutch lamellae of friction-disk clutches in which high edge-pressures within the grooves of the lamellae support element and of the securing ring as well as at the counterpressure plate and the securing ring are substantially eliminated, thereby assuring minimum wear together with a continued maintenance of predetermined spring characteristics.

It is a still further object of the present invention to provide an elastic support for the friction disks or lamellae of clutches which permits a design of the clutch with narrowly dimensioned venting plays.

A still further object of the present invention resides in the provision of a friction disk clutch construction in which the lever arm between the abutment forces at the counterpressure plate and the actuating force remains substantially constant, thereby improving the operating performance of the clutch.

A further object of the present invention resides in the provision of a friction disk clutch in which the counterpressure plate is elastically supported against a fixed housing part and in which the securing ring used for such support is constrained to purely axial spring movements during actuation of the clutch.

Still a further object of the present invention resides in the provision of a friction disk clutch of the type described above in which the spring characttritsics for the abutment of the counterpressure plate may be influenced in any suitable, desired manner.

These and other objects, features and advantages of the present invention will become more obvious from the following description when taken in connection with the accompanying drawing, which shows, for purposes of illustration only, one embodiment in accordance with the present invention, and wherein.

Figure 1:
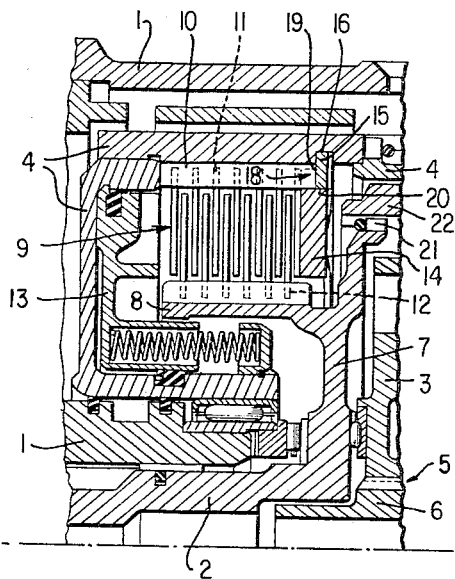
FIGURE 1 is a partial axial cross-sectional view through a shiftable friction disk clutch of a motor-vehicle change-speed gear with one embodiment of the resilient support of the clutch lamellae in accordance with the present invention.
Figure 2:
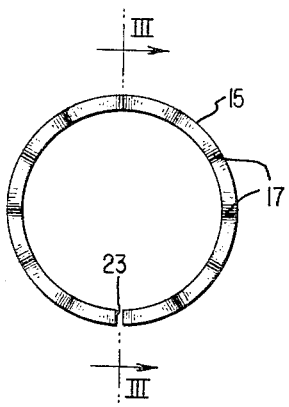
FIGURE 2 is an elevational view, on a reduced scale, of one construction of the securing ring in accordance with the present invention.
Figure 3:
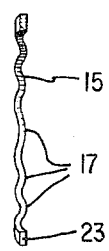
FIGURE 3 is a cross-sectional view through the securing ring taken along line III—III of FIGURE 2.

Referring now to the drawing wherein like reference numerals are used throughout the various views to designate like parts, and more particularly to FIGURE 1, the transmission input shaft 2 and the planet carrier 3 illustrated therein of a conventional planetary gear set (not shown) are rotatably supported within a fixed transmission housing 1. There is connected with the planet carrier 3 for rotation in unison therewith, on the one hand, a clutch housing 4 in any conventional not illustrated manner and, on the other hand, an intermediate transmission shaft 6 by way of claw teeth or spline means generally designated by reference numeral 5. The transmission input shaft 2 is provied with a radial web 7 having an axial extension 8 which is constructed as inner lamellae bearer or support member for a shiftable friction disk clutch generally designated by reference numeral 9. The web portion 7 is provided with clutch claws 21 for the non-rotatable connection with the hollow gear 22 of the non-illustrated planetary gear set. Internal axial grooves 10 for the accommodation of the housing lamellae 11 are accommodated within the clutch housing 4, which are adapted to be brought into frictional engagement with the inner lamellae 12. For that purpose an actuating piston 13 is guided in a pressure-tight manner within the clutch housing 4 which piston is adapted to be actuated in any conventional manner by a pressure medium. A counterpressure plate 14 is installed in the inner axial grooves 10 of the clutch housing 4 for rotation in unison therewith as abutment for the clutch lamellae 11 and 12 and is axially displaceable therewithin. The counterpressure plate 14 is supported on the side thereof opposite the lamellae 11 and 12 against a securing ring 15 which is inserted into an internal annular groove 16 of the clutch housing 4. The annular groove 16 is so constructed in the illustrated embodiment that the securing ring 15, constructed in FIGURES 2 and 3 in the manner of an undulated spring ring, is under pre-stress with a non-actuated or relieved actuating piston 13. The number of the wave-like or undulated portions 17 of the securing ring 15 determines with the same installation space the respective spring characteristics of the lamellae support in accordance with the present invention. The prestress, suitably selected by the appropriate construction of the annular grove 16, influences the magnitude of the transmittable starting torque with initiated clutch actuation by means of the pressure piston 13. The counterpressure plate 14 is provided with an aperture generally designated by reference numeral 18 for the parallel guidance of the securing ring 15 during its spring movement, the aperture 18 being constituted in effect by a radial annular surface 19 and the axial outer surface 20 of the counterpressure plate 14. The guide surfaces 20 of the aperture 18 prevent a tilting of the securing ring 15 during spring movements thereof. The securing ring 15 is provided with an interruption in its cross section in the form of a radial slot 23.

While I have shown and described one embodiment in accordance with the present invention, it is understood that the same is not limited thereto but is susceptible of numerous changes and modifications as known to a person skilled in the art; and I, therefore, do not wish to be limited to the details shown and described herein but intend to cover all such changes and modifications as are encompassed by the scope of the appended claims.

I claim:

1. A friction coupling, comprising first and second members rotatably mounted with respect to each other about an axis; a first friction plate mounted for rotation with said first member and mounted for limited relative axial movement with respect to said first member; a torque transmitting element mounted for rotation with said second member; means for mounting said torque transmitting element and said friction plate for relative axial movement into and out of engagement; power actuating means for selectively moving said torque transmitting element and said friction plate into and out of engagement; said first member having an axial annular abutment shoulder; an axially undulated annular disc spring means mounted axially between said abutment shoulder and said friction plate on the axially opposite side of said friction plate from said torque transmitting means for resiliently resisting axial movement of said friction plate away from said torque transmitting element during engagement; and means, including said abutment shoulders, for guiding said spring means for only axial parallel movement to prevent tilting of said spring means.

2. A multiple disc friction clutch, comprising: a first rotatably mounted member; a second rotatably mounted member; a plurality of friction discs, alternately secured for rotation with said first and second members and mounted for axial movement relative to their respective members into and out of engagement; a counter pressure plate on one axial side of said discs; actuator means on the other axial side of said discs for selectively engaging said clutch by pressing said discs into engagement with each other and said plate; mounting means for mounting said plate on one of said members for movement in the axial direction away from said discs against a resilient force; said mounting means including a groove in said one member, and an annular spring ring undulated in the axial direction about its circumference and mounted in said grove for axial abutment with said plate; and means, including said groove, for guiding said spring ring for only axial parallel movement to prevent tilting of said spring ring.

3. The device of claim 2, said spring ring having an axial dimension greater than the axial dimension of said groove in the unstressed condition and being axially prestressed within said groove to provide a relatively high starting torque during initial engagement of the clutch.

4. The device of claim 3, said plate having an annular recess receiving said spring ring.

5. The device of claim 4, said plate recess having an axially extending circumferential surface engaging said spring ring.

6. The device of claim 4, said spring ring having a rectangular cross-sectional shape in an axial plane with side surfaces and circumferential surfaces; said groove and said recess having adjacent radially extending side walls and mutually facing axially extending circumferential walls; said side walls being in axial engagement with corresponding ones of said side surfaces and said circumferential walls being in radial engagement with corresponding ones of said circumferential surfaces.

7. The device of claim 2, said plate having an annular recess receiving said spring ring.

8. The device of claim 7, said plate recess having an axially extending circumferential surface engaging said spring ring.

9. The device of claim 2, said spring ring having spaced terminal ends defining therebetween a radial slot to constitute a split ring.

References Cited by the Examiner

UNITED STATES PATENTS

| | | | |
|---|---|---|---|
| 2,968,381 | 1/1961 | Vosler | 192—69 X |
| 3,245,508 | 4/1966 | Livezey | 192—69 X |

DAVID J. WILLIAMOWSKY, *Primary Examiner.*

A. T. McKEON, *Assistant Examiner.*